Figure 1:
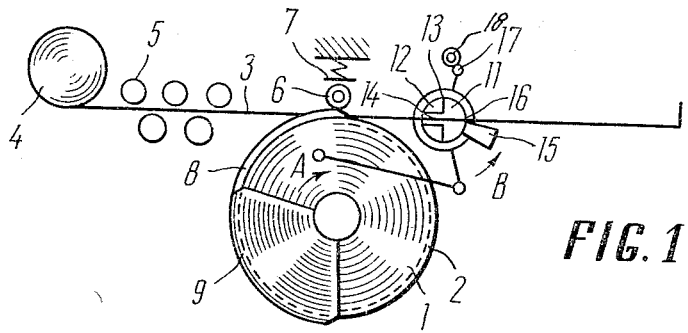

United States Patent Office 3,322,165
Patented May 30, 1967

3,322,165
MACHINE FOR AUTOMATICALLY MANUFACTURING A HOOK ARTICLE FROM WIRE OR STRIP MATERIAL
Kliment Nikolaevich Kan, Ligovsky Prospect 162, Apt. 15, and Nikolai Alexandrovich Jakovlev, Perekopskaja St. 5, Apt. 67, both of Leningrad, U.S.S.R.
Filed July 16, 1964, Ser. No. 383,203
9 Claims. (Cl. 140—80)

The present invention relates to devices intended for manufacturing articles from a wire or strip and more particularly to a device used for the manufacture of moulding hooks widely employed in founding.

Various devices are known at present to obtain wire articles and moulding hooks in particular, by means of universal automatic bending machines having a plurality of mechanisms for performing respective operation on the wire or strip. Such universal automatic bending machines comprise several mechanisms to feed the wire, cut it and carry out primary bending of the resulting wire piece, and including side bending slides, slides intended for the final bending of the wire and a puller for the completed hooks, etc.

The aforementioned mechanisms are driven from cams positioned on the main- and side shafts. Wire cutting is the first operation performed on said machines whereas all the subsequent operations deal with the already cut wire piece, and, therefore, these machines require a special device to retain said cut wire piece. That is why the design of the known universal automatic bending machines is complicated and they are bulky whereas the manufacturing process is laborious and inefficient.

Wire articles and mainly moulding hooks, widely used in founding, are in great demand at present and, consequently, the problems of simplifying the design of machines for manufacturing said articles, increasing the machine efficiency and making the manufacturing process less laborious assume great importance.

It is an object of the present invention to eliminate the disadvantages associated with the known machines.

It is another object of this invention to simplify the design of the automatic wire forming machine, and to mechanize the process of manufacturing articles and automate some of the operations.

The machine efficiency is increased according to the invention and the output is raised to 3600–6000 moulding hooks per hour with the production cost of the manufactured article largely reduced.

The problems associated with the known machines are solved by an automatic wire machine according to the invention comprising bending and cutting tools, a wire or strip feed mechanism and a discharge device for completed articles, wherein the working tool comprises a stationary cylindrical part and an oscillating ring rotatably fitted thereon. Both parts are provided with interacting bending stop blocks with cutting edges made fast on interengaged cylindrical surfaces of said parts. A slot is provided in the stationary cylindrical part to let the wire or strip pass therethrough, said slot forming the profiled part of its bending stop block. The interaction of said stop block with that of the oscillating ring brings about the primary bending of the wire piece or strip.

Mounted on the machine bed opposite the oscillating ring of the working tool is a stationary bending roller interacting with the bending stop block of the movable ring and bringing about secondary bending of the wire or strip.

The discharge device for the completed articles is affixed to the ring of the working tool and is in the form of a pusher.

The wire feed mechanism comprises a pulley with a circumferential groove, connected to the working tool by means of a crank gear, and a spring-loaded roller positioned on the machine bed, opposite the pulley groove and pressing the wire piece against the groove walls and feeding, thus, the wire to the working tool.

There is a boss on the pulley rim serving to release the spring-loaded roller to stop further feed of wire to the working tool as desired.

Provided on the pulley is a movable boss which is a continuation of said pulley boss and cooperates therewith to regulate the length of wire feed.

Thus the construction of the machine is simplified because of the elimination of several mechanisms, units and parts.

Another advantage of the machine according to the invention is that all the mechanims and units performing the working operations are driven from a common motor and hence the drive of the machine is simplified.

High efficiency of the machine is obtained due to combined performance of several operations by each mechanism of the machine.

Figure 2:
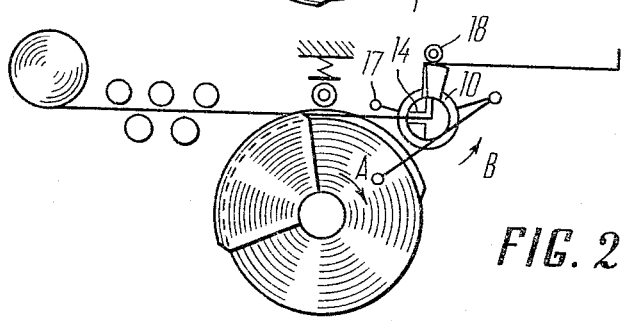
Figure 3:
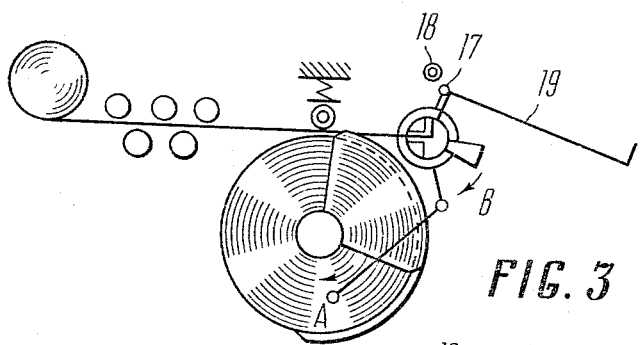
Figure 4:
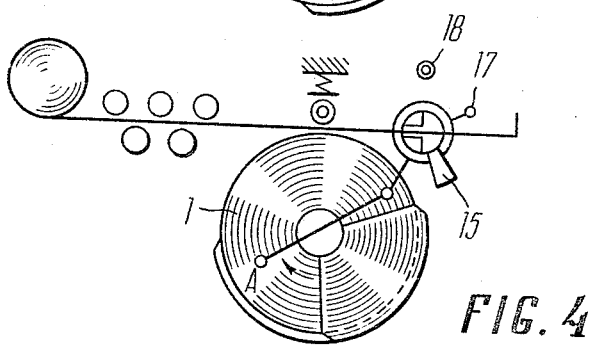

An embodiment of the invention is shown in the drawing wherein:

FIG. 1 is a diagrammatic illustration of an automatic machine according to the invention illustrating the final moment of the wire feed at a prescribed length into a bending and cutting zone, FIG. 2 is a diagrammatic illustration of the machine at the moment of simultaneous bending of the second (rear) end of the moulding hook to follow and also at the moment of cutting the ready hook from the wire, FIG. 3 is a diagrammatic illustration of the automatic machine at the moment when a ready moulding hook is removed by pusher, and FIG. 4 is a diagrammatic illustration of the automatic machine at the moment of feed of a wire of a prescribed length for subsequent bending and cutting.

In the drawing, a pulley 1 is shown which drives various mechanisms of the machine, said pulley in turn being rotated by an electric motor through a worm reducing gear (not illustrated in the drawing).

A groove 2 is formed on the pulley rim for the passage therethrough of a wire piece 3 which is unwound from a coil 4 and is fed through straightening rollers 5 into a bending and cutting zone.

Wire 3 is fed into the bending and cutting zone by engagement with pulley 1 and a spring-loaded roller 6. Roller 6 under the action of spring 7 presses the wire piece 3 against the walls of groove 2 and thus by friction the wire is displaced together with pulley 1 and is fed to the bending and cutting zone.

The feed of wire 3 and, consequently, the length of the manufactured moulding hook are controlled by means of a boss 8 provided on pulley 1 and a movable boss 9 both intended to release roller 6 from wire piece 3 and thus stop the wire feed for the period of bending, cutting and discharge of the moulded hook. The greater the combined length of the pulley boss 8 and the movable boss 9, the less will be the feed of wire 3 into the bending and cutting zone and, consequently, the less will be the length of the moulding hook. Conversely, the smaller the length of the two bosses, the greater will be the feed of wire 8 and, consequently, the length of the moulding hook.

By controlling the combined length of the two bosses 8 and 9 the precise length of feed of wire can be adjusted.

Pulley 1 by means of a crank gear is connected to a ring 10 performing an oscillatory rotary motion with respect to a supporting cylindrical part 11.

A bending former 12 is affixed to the face of the cylindrical part 11, said former having a cutting edge 13 and a groove 14 through which wire piece 3 is fed into the treatment zone.

A bending stop block 15 having a cutting edge 16 together with a pusher 17 are rigidly secured on the ring 10.

Upon rotation of pulley 1 in the direction of arrow A the ring 10 performs rotary motion in the direction of arrow B in FIG. 1.

At the moment the bending stop block 15 contacts the wire piece 3 (FIG. 1) the boss 8 on the pulley 1 releases the spring-loaded roller 6 and, thus, stops further wire feed into the treatment zone.

Upon further rotation of pulley 1 in the direction of arrow A the bending stop block 15 bends the wire piece around the fixed bending former 12 (FIG. 2) and, upon reaching a bending roller 18 made fast on the machine bed, bends the wire piece 3 for the second time, bending meantime the rear end of the maunfactured hook together with the front end of the hook to follow.

As soon as the wire piece 3 is bent for the second time the cutting edge 16 of the bending stop block 15 and cutting edge 13 of the bending former 12 cut a ready moulding hook 19 from the bent end of the next hook. Thereafter the ring 10 performs a rocking motion around the fixed axle in the opposite direction (FIG. 3) and pusher 17 ejects the manufactured moulding hook 19 from the machine.

When the bending stop block 15 travels out of the zone of wire bending and cutting (depending upon the prescribed length of the moulding hook 19) the spring-loaded roller 6 is released from boss 9 and presses the wire piece 3 against the walls of groove 2 of pulley 1 and the latter will feed a prescribed length of wire into the treatment zone. Then the whole operation cycle of the machine is repeated.

The height of the bent ends of the moulding hooks 19 is controlled by replacement of bending stop blocks 15 and interchanging hte bending rollers 18. When practicing the present invention both the cutting edge 13 of former 12 and the edge 16 of bending stop block are preferably constituted by two inserted knives. This will allow their rapid replacement when they are worn.

It should be also mentioned that the present invention provides for high efficiency of the machine by its specific and very simple design.

Though the present invention is described as applied to the manufacture of moulding hooks it can be also used to manufacture other wire articles.

Moreover, various modifications may be effected by persons skilled in the art without departing from the principle and scope of the invention.

While we have described a preferred embodiment of the invention it is to be understood that we do not limit ourselves to the particular details hereinabove set forth except as defined by the following claims.

What is claimed is:

1. An automatic machine for manufacturing wire articles comprising means for feeding a continuous length of wire along a prescribed path, a ring coupled to the latter means and driven thereby in oscillatory angular movement, said ring including bending and cutting means thereon, and tool means located in the path of the wire and rotatably supporting the ring for cooperating with the bending and cutting means thereon when the ring is rotated in one direction first to bend the wire and form a bent wire article and then to cut the thus bent wire.

2. A machine as claimed in claim 1 wherein said tool means comprises a stationary cylindrical member having a groove for the passage therethrough of said wire, and a bending and cutting block bounding said groove and in the path of travel of the bending and cutting means on said ring.

3. A machine as claimed in claim 1 comprising discharge means on said ring for contacting the bent wire article when the ring is rotated in opposite direction to discharge the article.

4. A machine as claimed in claim 3 wherein said discharge means is a pusher securely mounted on the ring.

5. A machine as claimed in claim 1 comprising a fixed bending member in the path of said bending means on the ring for cooperating therewith after the first bend has been made in the wire to form a second bend in the wire.

6. A machine as claimed in claim 1 wherein said means for feeding wire comprises a rotatably driven pulley having a peripheral groove therein for receiving the continuous length of wire, and a spring loaded roller urged towards the pulley to contact the wire and press the same in said groove whereby the wire is advanced by the rotation of the pulley.

7. A machine as claimed in claim 6 comprising a boss on said pulley for contacting said roller to interrupt feednig of the wire whereby the wire is fed in successive lengths.

8. A machine as claimed in claim 7 comprising an adjustable boss on said pulley in continuation of the boss thereon for regulating the length of the successive feeds of wire.

9. A machine as claimed in claim 1 comprising a crank mechanism coupling the ring and the feeding means for producing the oscillatory angular movement of the ring upon operation of the feeding means.

References Cited

UNITED STATES PATENTS

| | | | |
|---|---|---|---|
| 452,715 | 5/1891 | Miles | 140—80 |
| 1,716,093 | 6/1929 | Stackhouse | 140—80 XR |

WILLIAM J. STEPHENSON, *Primary Examiner.*